United States Patent
Müller et al.

(10) Patent No.: US 10,273,551 B2
(45) Date of Patent: Apr. 30, 2019

(54) METHOD FOR GENERATING A STRESS REDUCTION IN ERECTED TUBE WALLS OF A STEAM GENERATOR

(71) Applicants: Mitsubishi Hitachi Power Systems Europe GmbH, Duisburg (DE);
ALSTOM Technology Ltd., Baden (CH)

(72) Inventors: Jürgen Müller, Bergisch Gladbach (DE); Rudolf Thesing, Heiden (DE); Kurt Busekrus, Mülheim (DE); Carsten Stegemann, Krefeld (DE); Gerhard Weissinger, Koenegen (DE); Michael Heim, Horb (DE); Thoralf Berndt, Stuttgart (DE)

(73) Assignees: Mitsubishi Hitachi Power Systems Europe GmbH, Duisburg (DE);
General Electric Technology GmbH, Baden (CH)

(*) Notice: Subject to any disclaimer, the term of this patent is extended or adjusted under 35 U.S.C. 154(b) by 817 days.

(21) Appl. No.: 13/656,449

(22) Filed: Oct. 19, 2012

(65) Prior Publication Data

US 2013/0101949 A1   Apr. 25, 2013

Related U.S. Application Data

(60) Provisional application No. 61/549,785, filed on Oct. 21, 2011.

(30) Foreign Application Priority Data

Oct. 21, 2011   (DE) .................. 10 2011 054 718

(51) Int. Cl.
*B21D 51/24*   (2006.01)
*F22B 37/00*   (2006.01)
(Continued)

(52) U.S. Cl.
CPC .............. *C21D 1/30* (2013.01); *C21D 9/08* (2013.01); *C21D 9/50* (2013.01); *F22B 21/00* (2013.01);
(Continued)

(58) Field of Classification Search
None
See application file for complete search history.

(56) References Cited

U.S. PATENT DOCUMENTS 1,391,907 A * 9/1921 Schaffer ................... C21D 9/34
                                                               148/583
2,196,167 A * 4/1940 Hoak ....................... C21D 9/00
                                                               266/254

(Continued)

FOREIGN PATENT DOCUMENTS

AT          520796       6/2006
AU       2007255279     12/2007
(Continued)

OTHER PUBLICATIONS

Rhode Island Heat Treating Services—Heat Treating Specialties—Annealing, Tempering, Stress Relieving, Normalizing, Hardening, Quenching—"Stress Relieving", p. 2 of 4.*

(Continued)

*Primary Examiner* — Gregory A Wilson
(74) *Attorney, Agent, or Firm* — Knobbe Martens Olson & Bear LLP

(57) ABSTRACT

In the case of a method for the heat treatment of erected, preferably large-area tube wall regions or tube wall segments, in particular of a diaphragm wall, of a steam generator, in particular of a power plant, in the installed state, it is sought to provide a solution which permits the use of steel types which are more problematic with regard to power plant operation with elevated steam parameters, in particular (Continued)

the steels T23 and T24, in the erection of steam generators. This is achieved in that the tube wall regions or tube wall segments for heat treatment are subjected, in the installed state in the steam generator, and in particular over a large area, to a stress-relief annealing process.

26 Claims, 1 Drawing Sheet

(51) Int. Cl.

| | |
|---|---|
| B21C 37/08 | (2006.01) |
| B21D 53/08 | (2006.01) |
| B23K 9/18 | (2006.01) |
| B23K 31/00 | (2006.01) |
| B23K 31/02 | (2006.01) |
| B23P 15/26 | (2006.01) |
| C21D 1/30 | (2006.01) |
| C21D 1/34 | (2006.01) |
| C21D 9/08 | (2006.01) |
| F22B 37/02 | (2006.01) |
| C21D 9/50 | (2006.01) |
| F22B 21/00 | (2006.01) |
| C21D 11/00 | (2006.01) |

(52) U.S. Cl.
CPC ............ *F22B 37/00* (2013.01); *F22B 37/025* (2013.01); *C21D 9/085* (2013.01); *C21D 11/00* (2013.01); *F05D 2230/41* (2013.01); *Y10T 29/49387* (2015.01)

(56) References Cited

U.S. PATENT DOCUMENTS

| | | | | |
|---|---|---|---|---|
| 2,596,345 A * | 5/1952 | Penrod | ..................... | C21D 9/34 134/123 |
| 3,944,444 A * | 3/1976 | Thiess | ..................... | C21D 9/38 148/578 |
| 3,989,231 A * | 11/1976 | Randerson | .............. | B21B 45/08 134/199 |
| 4,211,088 A * | 7/1980 | Mayers | .................. | C21D 9/667 134/166 C |
| 4,229,235 A * | 10/1980 | Matsuda | .................. | C21D 9/14 148/325 |
| 4,247,284 A * | 1/1981 | Mayers | .................. | C21D 9/667 134/166 C |
| 4,275,569 A * | 6/1981 | Mayers | .................. | F27D 9/00 134/166 C |
| 4,326,897 A * | 4/1982 | Ruhe | ..................... | C21D 9/0068 148/239 |
| 4,381,735 A * | 5/1983 | Brunner | ................ | F22B 37/208 122/510 |
| 4,418,652 A * | 12/1983 | Rees | ..................... | F22B 37/125 122/235.12 |
| 4,470,188 A * | 9/1984 | Holbrook | .............. | B21C 37/151 138/148 |
| 4,531,973 A * | 7/1985 | Nixon | ..................... | C01B 3/12 75/10.41 |
| 4,538,442 A * | 9/1985 | Reed | ..................... | B21C 37/154 29/455.1 |
| 4,578,366 A * | 3/1986 | Cetinkaya | .............. | B01J 8/1809 208/113 |
| 4,579,087 A * | 4/1986 | Stol | ....................... | F22B 37/104 122/235.12 |
| 4,579,089 A * | 4/1986 | Kral | ..................... | F22B 37/645 122/493 |
| 4,624,750 A * | 11/1986 | Malagola | ................ | F22B 37/04 205/131 |
| 4,639,992 A * | 2/1987 | Stol | ....................... | F22B 37/025 165/134.1 |
| 4,714,501 A * | 12/1987 | Yamanaka | ................ | C22F 1/10 148/428 |
| 4,749,122 A * | 6/1988 | Shriver | ................... | F23N 1/022 122/448.1 |
| 4,816,089 A * | 3/1989 | Cheng | ...................... | C21D 9/08 148/675 |
| 4,820,359 A * | 4/1989 | Bevilacqua | ............... | C22F 1/10 148/511 |
| 4,842,655 A * | 6/1989 | Porowski | .................. | C21D 1/00 148/592 |
| 4,883,946 A * | 11/1989 | Jacquier | ................... | C21D 9/08 219/523 |
| 4,979,995 A * | 12/1990 | Hattori | .................. | C22C 19/055 148/410 |
| 5,015,828 A | 5/1991 | Ritz et al. | | |
| 5,207,972 A * | 5/1993 | Hemsath | .................. | F27B 3/26 266/262 |
| 5,297,959 A * | 3/1994 | Hemsath | .................. | F27B 3/26 266/262 |
| 5,303,678 A * | 4/1994 | Haumann | ................. | F23C 6/04 122/1 R |
| 5,359,172 A * | 10/1994 | Kozak | ..................... | B23K 26/28 219/121.64 |
| 5,519,748 A * | 5/1996 | Adamson | ................. | C22F 1/186 148/519 |
| 5,670,072 A * | 9/1997 | Offer | ........................ | B23K 9/02 219/136 |
| 5,681,407 A * | 10/1997 | Yu | ............................. | C21D 1/56 148/508 |
| 5,688,419 A * | 11/1997 | Offer | ........................ | B23K 9/02 219/137 R |
| 5,855,699 A * | 1/1999 | Oyama | .................... | B21C 37/06 148/519 |
| 6,024,805 A * | 2/2000 | Kim | ........................ | C23C 26/00 148/240 |
| 6,264,770 B1* | 7/2001 | Hong | ....................... | C21D 1/78 148/663 |
| 6,344,097 B1* | 2/2002 | Limoges | ................... | C22F 3/00 148/592 |
| 6,651,035 B1* | 11/2003 | Lang | ........................ | F22B 35/18 165/11.1 |
| 6,745,152 B1* | 6/2004 | Lang | ........................ | F22B 35/18 165/11.1 |
| 8,246,767 B1* | 8/2012 | Jablonski | ................ | C23C 12/02 148/605 |
| 8,713,794 B2 | 5/2014 | Hartwig et al. | | |
| 2003/0038167 A1* | 2/2003 | Komai | .................. | B23K 9/0026 228/255 |
| 2003/0051779 A1* | 3/2003 | Harth, III | ................ | F22B 37/04 148/525 |
| 2003/0121574 A1* | 7/2003 | Brenner | ............... | B23K 10/027 148/565 |
| 2003/0121956 A1* | 7/2003 | Offer | ...................... | B23K 9/232 228/214 |
| 2003/0122290 A1* | 7/2003 | Wunsche | ................ | C21B 11/08 266/200 |
| 2004/0103963 A1* | 6/2004 | Miyahara | ................ | C22C 19/058 148/675 |
| 2006/0113010 A1* | 6/2006 | Saitou | ...................... | C21D 9/08 148/570 |
| 2007/0068605 A1* | 3/2007 | Statnikov | ............... | C21D 10/00 148/558 |
| 2008/0099148 A1* | 5/2008 | Ryabova | .................. | C04B 35/505 156/345.48 |
| 2008/0230155 A1* | 9/2008 | Lai | ............................. | C21D 1/18 148/529 |
| 2010/0031506 A1 | 2/2010 | Hartwig et al. | | |
| 2010/0064519 A1* | 3/2010 | Hartwig | .................... | C22F 1/10 29/890.053 |
| 2010/0065159 A1* | 3/2010 | Hartwig | .................... | B21D 53/06 148/519 |
| 2010/0116383 A1* | 5/2010 | Cloue | ...................... | C21D 1/74 148/675 |
| 2010/0163142 A1* | 7/2010 | Ott | .......................... | C21D 1/785 148/675 |
| 2010/0326974 A1 | 12/2010 | Ota et al. | | |

(56) References Cited

U.S. PATENT DOCUMENTS

| | | | | |
|---|---|---|---|---|
| 2012/0018054 A1* | 1/2012 | Lee | ............... | B82Y 30/00 |
| | | | | 148/505 |
| 2012/0285577 A1* | 11/2012 | Kinomura | ............ | C21D 9/08 |
| | | | | 138/177 |
| 2012/0291720 A1* | 11/2012 | Berndt | ............ | F22B 21/00 |
| | | | | 122/406.4 |
| 2014/0048020 A1* | 2/2014 | Hur | ............... | F22B 37/24 |
| | | | | 122/510 |
| 2015/0047735 A1* | 2/2015 | Miyahara | ............ | F16L 9/02 |
| | | | | 138/177 |
| 2016/0109116 A1* | 4/2016 | Higgins | ............ | F22B 21/00 |
| | | | | 122/235.12 |

FOREIGN PATENT DOCUMENTS

| | | |
|---|---|---|
| CA | 1067694 A | 12/1979 |
| DE | 10 2005 033 360 A1 | 1/2007 |
| DE | 10 2008 037 085 B3 | 8/2009 |
| EP | 2119799 A | 11/2009 |
| JP | 59-1638 A | 1/1984 |
| JP | 60-248819 A | 12/1985 |
| JP | 1988(63)-227724 | 9/1988 |
| JP | 63-286520 A | 11/1988 |
| JP | H03 260019 | 11/1991 |
| JP | 11-226738 A | 8/1999 |
| JP | 2000-061691 | 2/2000 |
| JP | 2003-90506 A | 3/2003 |
| JP | 3-260019 A | 9/2003 |
| JP | 2005-232586 | 9/2005 |
| JP | 2009-540118 T | 11/2009 |
| WO | WO 02/48411 A1 | 6/2002 |
| WO | WO 2007/141427 | 12/2007 |
| WO | WO 2008/084855 | 7/2008 |

OTHER PUBLICATIONS

European Search Report for EP 12 18 5628 dated Jan. 21, 2014.
Office Action in Japanese application No. P2012-229834, mailed on Sep. 8, 2015, with an English translation.
Babcock Borsig Steinmüller GmbH, Opposition dated Nov. 12, 2014 in German Patent Application No. 10 2011 054 718 filed Oct. 21, 2011, 24 pages.
German Steam Vessel Committee. 2002. Technische Regeln für Dampfkessel (*Technical rules for steam vessels*), Köln, Germany: Carl Heymanns Verlag KG, pp. 154-155, 9 pages. (D4).
Krüger, F. K. Sep. 1985. Wärmebehanldung von geschweißten Großbauteilen durch Heißluftglühen (Heat treatment of large welded components through hot-air annealing), German Welding Society DVS-Verlag GmbH, Dusseldorf, 1996, from the magazine *Der Praktiker*, pp. 494-497, 13 pages. (D5).
Krüger, F. K. 1996. Wärmebehandlung von geschweißten Großbauteilen am Herstellungsort durch Heißluftglühen (Heat treatment of large welded components at the site of manufacture through hot air annealing). Presentation held at the special meeting "Schweißen im Anlagen- und Behälterbau" (*Welding in plant and boiler construction*) in Munich on Feb. 21-23, 1996. German Welding Society DVS-Verlag GmbH, Dusseldorf, DVS reports, 172:74-77, 17 pages. (D1).
Standards committee chemical apparatus engineering (FNCA) in DIN. German Standard DIN EN 13445-4. German version EN 13445-4:2009. Dec. 2013. Unfired pressure vessels—Part 4: Fabrication. 60 pages. (D7).
Standards committee heat treatment technology of metals materials (NWT) in DIN German Institute for Standardization. European standard DIN EN 10 052. Jan. 1994. German version EN 10 052:1993. Vocabulary of heat treatment terms for ferrous products, pp. 134-156, 72 pages. (D2).
Sterner, C. 2007. Schweißtechnische Reparaturen von Dampftrommeln aus dem Werkstoff 15 NiCuMoNb 5-6-4 (WB 36) (Welding-technical repairs of steam drums from the material 15 NiCuMoNb 5-6-4 (WB 36)). Presentation at the DVS District Association Cologne on Mar. 1, 2007, 40 pages. (D6).
Viering Jentschura & Partner, Response dated May 11, 2015 to Opposition in German Patent Application No. 10 2011 054 718 filed Oct. 21, 2011, 28 pages.
T24 from utilities' view and experiences with RWE projects. RWE. VGB Powertech. Dr. Ralf Nowack, RWE Technology GmBh. VGB Congress Sep. 21-23, 2011, Bern.
State of the Art Report on Elevated Temperature Properties of Ferritic/Martensitic Steels for Application to Future Nuclear Reactors. A report available at the web site of International Atomic Energy Agency (http://www.iaea.org/inis/collection/NCLCollectionStore/_Public/37/122/37122253.pdf; Dec. 2005).
English Translation of Preliminary Rejection for Korean Patent Appln. No. 2012-0116361.

* cited by examiner

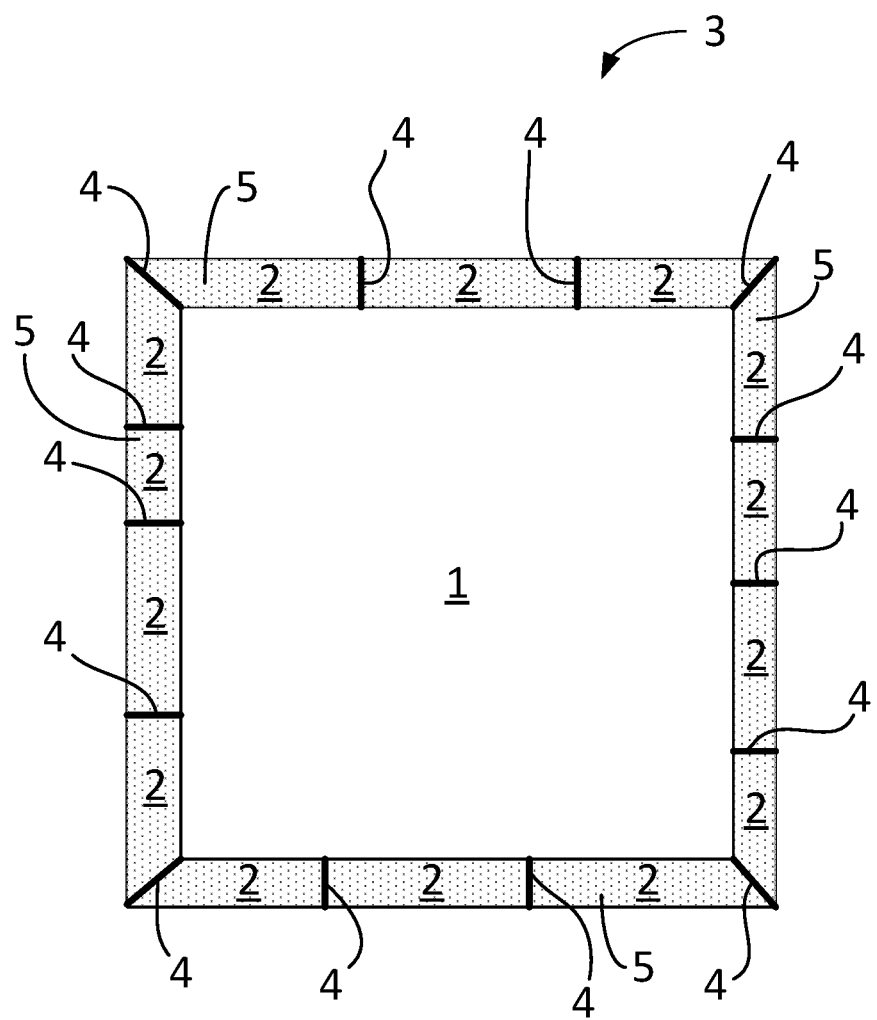

METHOD FOR GENERATING A STRESS REDUCTION IN ERECTED TUBE WALLS OF A STEAM GENERATOR

CROSS-REFERENCE TO RELATED APPLICATIONS

This application is claims priority to German Patent Application No. DE 10 2011 054 718.5, filed Oct. 21, 2011, and U.S. Provisional Patent Application No. 61/549,785, filed Oct. 21, 2011, each of which are hereby incorporated by reference in their entirety.

BACKGROUND OF THE INVENTION

Field of the Invention

This application relates to the field of steam generation.

Description of the Related Art

In the last 25 years, there has been a worldwide tendency towards increasing the efficiency and effectiveness of fossil-fired, in particular powdered-coal-fired, power plants in order to reduce emissions and thereby conserve fuel resources. To achieve this aim, it is necessary at the steam side to increase the steam parameters of pressure and temperature of the steam generator. The increase of said parameters of pressure and temperature leads to increased stresses in the tubes and in the tube walls of the steam generator. The walls which surround the combustion chamber of the steam generator and which are formed as evaporators or else as superheaters are often formed as diaphragm walls. Said walls are subjected to additional material stresses in that, during the erection of the diaphragm walls in the combustion chamber of the steam generator, further welding work must be performed here which could not be performed in the workshop beforehand. Owing to the size of the steam generators, it is additionally necessary here for diaphragms or webs to be welded to one another, or for diaphragms or fins/webs to be welded to tubes. Furthermore, openings which are formed, so-called windows, are welded by means of metal sheets.

Under the more stringent requirements, previously used materials such as the steel type T12 (ASTM 213) can no longer be used because these, owing to the technically relatively low stress loading capacity of the material, would necessitate very thick walls of the individual tubes of a tube wall, which would lead to a dramatic rise in the temperature required within the combustion chamber. To increase the admissible stress loadings of the material, further materials such as T22, T23 or T24 (ASTM 213) have therefore been developed. Said materials can in part be used without heat treatment after a welding process which is required during the erection of the steam generator. Problems have also been identified after a cleaning process, for example internal pickling of the tubes of a diaphragm wall. Depending on the application, the processing of said materials may result in the occurrence of stress corrosion cracking.

Stress-relief annealing heat treatment of tubular steel parts as structural components of body parts or chassis parts of a motor vehicle is known from DE 10 2005 033 360 A1.

Furthermore, it is known from WO 02/48411 A1 for cooling processes during the heat treatment of steel components to be controlled by virtue of media being sprayed or blown on.

BRIEF DESCRIPTION OF THE DRAWINGS

The FIGURE is a plan view of an embodiment of a steam generator including a combustion chamber surrounded by a plurality of tube wall regions or tube wall segments which have been welded together.

SUMMARY OF THE INVENTION

The invention is based on the object of providing a solution which permits the use of steel types which are more problematic with regard to power plant operation with elevated steam parameters, in particular the steels T23 and T24, in the erection of steam generators.

DETAILED DESCRIPTION OF THE PREFERRED EMBODIMENT

The invention is directed to a method for the heat treatment of erected, preferably large-area tube wall regions or tube wall segments, in particular of a diaphragm wall, of a steam generator, in particular of a power plant, in the installed state.

The invention is also directed to a method for erecting tube walls, which surround a combustion chamber, of a steam generator, in particular of a power plant, wherein tube wall regions or tube wall segments are manufactured, are connected to one another by welding and are placed into their installation position, in which they surround the combustion chamber, in the steam generator. The FIGURE is a plan view of an exemplary embodiment of a steam generator 3 including a combustion chamber 1 surrounded by a plurality of tube wall regions or tube wall segments 2 which have been welded together. Example welds 4 are illustrated.

Tests have shown that one of the prerequisites for stress corrosion cracking which occurs in erected tube walls of a steam generator is high stresses caused by internal stresses generated in tube wall regions or tube wall segments when welding is performed during the manufacture and erection of the tube walls. It is now proposed that said internal stresses present in the material, together with the construction-induced material stresses, which are in principle present, of long components such as those from which the tube walls are assembled, the stresses caused by the high weights of the components, and the stresses arising owing to the grain (size) variations which occur during welding, be reduced by means of a stress-relief annealing process of the tube wall regions or tube wall segments, which are intended for heat treatment, in the steam generator in its erected and installed position, that is to say of the erected steam generator tube walls which are situated in their installed position. It is thus provided according to the invention that the tube wall regions or tube wall segments are arranged or erected in the combustion chamber, or so as to surround the latter, of an in particular fossil-fired power plant in the conventional way, are in particular welded to form the tube walls and if appropriate welded to further components, and then subsequently, those tube wall regions which are to be subjected to heat treatment are subjected to a stress-relief annealing process in their installed state and in their installed position in the steam generator, and are annealed in a stress-relieving manner. Here, the tube wall regions or tube wall segments, which in the steam generator which may have a square footprint of for example 30×30 m and a height of over 100 m are of correspondingly large-area form, are subjected over a large area to a stress-relief annealing process which covers or acts on in each case large regions of the tube wall regions or tube wall segments for heat treatment, and in this context likewise acts over a large area and is performed or imparted over a large area. Here, the stress-relief annealing process covers in particular also but specifically not exclusively those tube wall regions or tube wall segments which have also undergone welding work during the erection and positioning of the tube wall segments and tube wall regions at the construction site to form the tube walls which surround the steam generator. The regions where such welding work has been performed are then treated by means of a stress-relief annealing process on site, that is to say within the context of the above statements jointly together with the other wall regions. This refers in particular to diaphragm tube walls or diaphragm tube regions of the steam generator, which are then subjected to the method according to the invention for stress-relief annealing.

The invention is thus characterized in particular by a method for the heat treatment of erected, preferably large-area tube wall regions or tube wall segments, in particular of a diaphragm wall, of a steam generator, in particular of a power plant, in the installed state, wherein the tube wall regions or tube wall segments for heat treatment are subjected, in the installed state in the steam generator, and in particular over a large area, to a stress-relief annealing process. In the FIGURE, shaded area 5 represents an exemplary large area over which the heat treatment can be applied.

The invention is furthermore characterized by a method for erecting tube walls, which surround a combustion chamber, of a steam generator, in particular of a power plant, wherein tube wall regions or tube wall segments are manufactured, are connected to one another by welding and are placed into their installation position, in which they surround the combustion chamber, in the steam generator, and the erected and installed tube wall regions or tube wall segments, in particular where they form a diaphragm wall, are subjected, in their installed position in the installed state in the steam generator, and in particular over a large area, to a stress-relief annealing process.

In the present invention, "in the installed state" thus means in particular that the respective tube wall segments are or have been placed into their final situation or installed position in the steam generator or within the steam generator of a power plant, and have already undergone the respectively intended joining processes, that is to say in particular have already been welded to one another or to other components. In this context, the stress-relief annealing is thus performed on the tube walls or tube segments in the steam generator and in the erected and welded state. The invention is thus also directed to a method in this regard for erecting tube walls which surround a combustion chamber.

To generate the material temperature desired or required for the stress-relief annealing process, it is expedient for the (in each case required or desired) material temperature to be generated by heating or warming the tube wall region for heat treatment from the outside and/or from the inside. If appropriate, the warming of the tube wall region for heat treatment thus takes place from the outside, wherein furthermore, it is also basically expedient for said heating to be performed "non-electrically". In this context, the invention is therefore furthermore characterized, in one embodiment, in that the material temperature required or desired in each case for the stress-relief annealing process is generated by heating or warming the tube wall region for heat treatment by means of a warmed heating gas or hot gas, preferably hot flue gas or hot air.

One particular embodiment of the method for heat treatment consists in a hot flue gas being generated within the combustion chamber of the steam generator by combustion of an in particular fossil fuel such as for example coal, oil or gas, which flue gas then rises within the steam generator at the combustion chamber side to the tube walls and/or is introduced into the tubes of the tube walls and, by heat transfer, heats the tube wall regions for heat treatment (but also other tube wall regions) to the desired material temperature from the outside and/or from the inside. It is self-evidently also possible here for a flue gas or hot gas or heating gas or hot air at adequate temperature to be generated outside the combustion chamber of the steam generator and then introduced into the combustion chamber and/or at the inside into the tubes of the tube wall regions for heat treatment. In the case of the method for heat treatment, the invention is thus furthermore wherein, within the combustion chamber of the steam generator, a hot flue gas or hot air is generated through the combustion of an in particular fossil fuel, or in that a hot flue gas or hot air or a hot gas is introduced into the combustion chamber of the steam generator and/or the tubes of the tube wall regions for heat treatment, and in that the respective hot flue gas or the respective hot air or the respective hot gas is supplied at the outside and/or at the inside to the tube wall regions for heat treatment.

Here, a stress-relief annealing process is to be understood to mean a stress-relief annealing process as per DIN EN 10052. The temperature to be attained here in the tube material should preferably lie in the range from 400-600° C. and preferably >500° C., in particular >550° C. Holding times should last >12 hours, in particular >24 hours, but generally no longer than one week.

The invention is thus furthermore characterized, in one embodiment, in that, during the stress-relief annealing process, a material temperature of the tube wall regions for heat treatment or heat-treated tube wall regions of 400° C. to 740° C., preferably 400° C. to 600° C., is set, and/or of ≥500° C., preferably of 500° C. to 600° C., is set, and/or of ≥550° C., preferably of 550° C. to 700° C., and/or of ≤740° C., in particular of 740° C. to 500° C., preferably ≤600° C., particularly preferably of 600° C. to 550° C., is set, as is likewise provided by the invention in one embodiment.

Here, it is particularly expedient if, during the stress-relief annealing process, the material temperature and/or the expansion of the tube wall regions for heat treatment or heat-treated tube wall regions are/is controlled and/or regulated, as is likewise provided by the invention.

With regard to the holding times, the invention is wherein, during the stress-relief annealing process, the material temperature is held for a holding time of ≥12 hours, in particular ≥24 hours.

Here, however, the annealing process itself is expediently limited, even in the case of large steam generators, to a time period of at most one week. The invention therefore provides, in a further embodiment of the method for heat treatment, that, during the stress-relief annealing process, the material temperature is held for a holding time of less than one week. Here, however, a holding time of usually ≥12 hours, in particular >24 hours, is provided, such that a stress-relief annealing process generally lasts between one and a maximum of seven days.

To be able to adjust and regulate the temperature during the stress-relief annealing process in the tube wall regions or tube wall segments, the invention provides that, during the stress-relief annealing process, the material temperature and/or the expansion of the tube wall regions for heat treatment or heat-treated tube wall regions are/is controlled and/or regulated. Here, it may furthermore be the case that the stress-relief annealing process is adjusted and regulated by means of the measurement of the expansion and/or the material temperature of the tube wall regions or tube wall segments for heat treatment in each case and by means of the adjustment and regulation of the combustion rate for generating the flue gas or the hot air or the hot gas, preferably in the combustion chamber of the steam generator, and/or the throughflow rate of the cooling medium is adjusted and regulated.

To be able to control and influence the temperature of the tube wall regions or tube wall segments, which are subjected to a stress-relief annealing process, during the heat treatment, but in particular to prevent the temperature from becoming too high, the method according to the invention for heat treatment is furthermore wherein, during the stress-relief annealing process, the material temperature and/or the expansion of the tube wall regions for heat treatment or heat-treated tube wall regions are/is cooled and preferably regulated by means of a cooling medium, preferably a cooling medium flowing inside the tubes of the heat-treated tube wall region, preferably by means of air conducted into the tubes.

To prevent tube wall regions not for heat treatment from being heated to an undesired temperature (in the process), and to prevent the tube wall regions for heat treatment from being warmed (here) to a temperature which lies above the desired material temperature range, those tube lines which are assembled to form the wall, in particular diaphragm wall, and which are connected to one another can be cooled generally from bottom to top in the steam generator by air introduced into the tubes at the steam side. The air can be introduced into the tube lines at a desired location. It may also be provided that, in addition, for cooling, the air is cooled or the tubes are sprayed at the inside and/or at the outside with water for cooling. By means of said approach, it is possible for entire tube wall regions or tube wall segments to be heat-treated in particular over a large area in the installed state in the steam generator. This is not possible with electric heat treatment pads. Furthermore, by means of this approach and in particular the methods according to the invention, the temperature can be regulated in such a way that deformations ("bubbles") arising during the electric heating or heat treatment cannot occur and can be prevented. For this purpose, it may in particular additionally be provided that, if appropriate, the tube wall regions or tube wall segments for heat treatment are monitored with regard to their thermal expansion by means of corresponding detectors.

To attain the advantages discussed in the preceding paragraph and in order to implement the approach or method associated therewith, the invention is furthermore characterized, in one embodiment, in that, during the stress-relief annealing process, tube wall regions not for heat treatment and in particular adjoining tube wall regions for heat treatment are cooled simultaneously from the outside and/or inside by means of a cooling medium, preferably air or atomized water spray, in particular to a material temperature below the stress-relief annealing temperature.

Here, it is then furthermore expedient if, during the stress-relief annealing process, tube wall regions for heat treatment and tube wall regions not for heat treatment adjoining the tube wall regions for heat treatment are cooled by means of the/a cooling medium, preferably cooling air, flowing through or along the outside of the conductively interconnected tube wall regions for heat treatment and tube wall regions not for heat treatment, as is likewise provided by the invention.

Here, in a further embodiment of the method according to the invention for heat treatment, it is advantageous if, during the stress-relief annealing process, both the tube wall regions for heat treatment and also, conductively connected thereto, tube wall regions not for heat treatment are impinged on from the outside or from the inside by hot flue gas or hot air or hot gas and, for this purpose, are cooled reciprocally from the inside or from the outside by means of a cooling medium flowing through, preferably cooling air.

It may additionally be provided here that, during the stress-relief annealing process, tube wall components of the steam generator are cooled from the outside by being sprayed with cooling water, and/or are cooled from the inside by virtue of cooling water being injected or sprayed in.

The methods according to the invention are used in particular for critical tube wall components of the steam generator, wherein critical tube wall components are ones which, owing to their material and/or the welding processes to which they are subjected during their manufacture and/or their installation into the steam generator, are regarded as being at particularly high risk if they are not correspondingly heat-treated.

The method for heat treatment is thus used in particular for the materials T23 or 7CrMoWVMoNb 9-6 or T24 or 7CrMoVTiB 10-10. The invention is therefore furthermore wherein tube wall regions or tube wall segments composed of the material T23 or 7CrMoWVMoNb 9-6 or T24 or 7CrMoVTiB 10-10 are subjected to the/a stress-relief annealing process.

The method according to the invention for heat treatment is used in particular on superheaters of a (large) steam generator, for which reason the invention is furthermore wherein the tube wall regions of the superheater of the steam generator of a power plant are subjected to the stress-relief annealing process.

In particular, the method according to the invention for heat treatment can also be successfully used after a repair welding process is performed on already erected tube wall regions or tube wall segments of a steam generator pipe wall. The invention is thus furthermore wherein the stress-relief annealing process is performed after the tube wall regions for heat treatment have undergone repair work, in particular a repair welding process.

By means of the methods defined in more detail in the claims, it is possible to perform stress-relief annealing, in particular over a large area, of tube walls or tube wall regions or tube wall segments of an erected steam generator in the temperature range which moves the stresses which are present into a low-stress range which constitutes a non-critical level.

It may be provided here that the tube regions or tube segments for heat treatment are subjected, from the combustion chamber side of the steam generator, to a temperature which leads to a stress-relief annealing process and which is adequate and necessary for stress-relief annealing. In this context, the tube wall regions are subjected to a stress-relief annealing process "from the outside" or "at the outside". In this case, either a correspondingly hot flue gas is generated in the combustion chamber of the steam generator, or there is conducted into the combustion chamber a heating gas or hot gas or hot air which then, in this context, flows at the outside along the tube wall regions or tube segments for heat treatment, transferring heat to the tube wall side or tube wall surface facing towards the combustion chamber. In this case, it may then be possible for the tubes of the tube wall regions to be cooled at the inside by air or some other cooling medium, such as for example water, flowing through them, and to thus adjust and control firstly the expansion in particular of the regions for heat treatment and secondly the temperature, in particular of the regions for heat treatment.

In the same way, it also falls within the scope of the invention, and may be provided, that the tube wall regions for heat treatment are subjected to heat "from the inside" or "at the inside". In this case, a flue gas or hot gas or hot air which is hot enough to generate the temperature of the tube wall material required for the stress-relief annealing process is conducted into (the) tubes of the tube wall regions or tube wall segments for heat treatment. Said hot heat transfer medium (hot flue gas, hot gas, heating gas, hot air, etc.) then flows at the inside through (the) tubes of the tube wall regions and tube wall segments for heat treatment, and transmits to the tube wall inner surface or inner tube wall surface the heat required to attain the temperature required or desired for the stress-relief annealing process. In this case, cooling "from the outside" or "at the outside", that is to say from the combustion chamber side of the steam generator, may then be performed, wherein the cooling may encompass or apply to the tube wall regions or tube wall segments for heat treatment and/or however also to the tube wall regions or tube wall segments not for heat treatment. In this case, too, through corresponding cooling at the outside and warming or heating of the respective tube wall regions at the inside, it is possible to adjust and control firstly the expansion in particular of the regions for heat treatment and secondly the temperature in particular of the regions for heat treatment.

In addition, temperature measurements at the individual tube wall regions, in particular the tube wall regions for heat treatment, are of course possible by means of known, in particular contactless measurement methods. The temperature measurement results may likewise be utilized for controlling and regulating the stress-relief annealing process.

The method according to the invention offers advantages in particular for the treatment of tube wall regions or tube wall segments which are manufactured from the steels T23 or T24 (designation as per ASTM 213) or the corresponding steels 7CrMoWVMoNb 9-6 and 7CrMoVTiB 10-10 (designation as per DIN EN 10216).

Even where reference is made only to the "tube wall region" above, or below in the claims, this always refers in each case also to "tube wall segments".

In particular, the above-described method for heat treatment can expediently be applied to a method for erecting tube walls, which surround a combustion chamber, of a steam generator, for which reason the invention is finally characterized, in one embodiment of the method for erecting such tube walls, in that, a stress-relief annealing process can be applied to erected and installed tube walls.

According to the invention, the heat energy which must be provided in order to attain the temperature required for a stress-relief annealing process can be provided by means of hot air or hot gas, and transported to the location at which the stress-relief annealing process is performed. Here, the hot air or the hot gas may be generated not only through the combustion of a fuel with a supply of air or a supply of oxygen but rather in any technically conceivable and possible manner. In particular, it is also possible for hot air or a hot gas to be generated by means of electrical energy, as is the case for example in blowers, fans or drying fans which are provided with heating devices or heating wires. A purely mechanical temperature increase of a gas or of air by means of compression in a corresponding compressor also constitutes a possibility for generating a hot gas or hot air. A heating gas or hot gas which is at a temperature sufficient for carrying out a stress-relief annealing process, or a temperature sufficient for carrying out a stress-relief annealing process, may however also be generated using heat exchangers in which heat energy is transferred from a heat carrier medium to air or heating gas flowing through said heat exchanger or flowing past said heat exchanger.

What is claimed is:

1. A method for the heat treatment of tube wall regions or tube wall segments of erected steam generator tube walls in their installed state surrounding a combustion chamber of a steam generator in a fossil-fired power plant, wherein large-area tube wall regions or tube wall segments have been welded together to form the erected steam generator tube walls, said method comprising:
subjecting substantially an entirety of the large-area tube wall regions or tube wall segments of said erected steam generator tube walls of the steam generator in the fossil-fired plant to a large-area heat treatment of a stress-relief annealing process while in their installed state surrounding the combustion chamber of the steam generator of the fossil-fired power plant by heating substantially the entirety of the large-area tube wall regions or tube wall segments with a warmed heating gas, a hot gas, a hot flue gas, or hot air;
generating, within the combustion chamber of the steam generator, the warmed heating gas, the hot gas, the hot flue gas, or the hot air through the combustion of a fuel, or introducing the warmed heating gas, the hot gas, the hot flue gas, or the hot air into at least one of the combustion chamber of the steam generator and the tubes of the tube wall regions or tube wall segments for heat treatment; and
supplying the warmed heating gas, the hot gas, the hot flue gas, or the hot air to at least one of the outside and the inside of the tube wall regions or tube wall segments for heat treatment as part of the stress-relief annealing process, wherein the tube wall regions or tube wall segments are part of a diaphragm wall.

2. The method according to claim 1, wherein the fuel comprises a fossil fuel.

3. The method of claim 1, wherein the stress-relief annealing process comprises heating the tube wall regions or tube wall segments for heat treatment to a material temperature selected from the group consisting of 400° C. to 600° C., 500° C. to 600° C., 550° C. to 700° C., and 550° C. to 600° C.

4. The method of claim 1, wherein the stress-relief annealing process comprises heating the tube wall regions or tube wall segments to a material temperature selected from the group consisting of 400° C. to 740° C. and 500° C. to 740° C.

5. The method according to claim 1, wherein the stress-relief annealing process comprises holding the tube wall regions or tube wall segments at a material temperature for a holding time of ≥12 hours.

6. The method according to claim 5, wherein the holding time is ≥24 hours.

7. The method according to claim 1, wherein the stress-relief annealing process comprises holding the tube wall regions or tube wall segments at a material temperature for a holding time of less than one week.

8. The method according to claim 1, wherein, during the stress-relief annealing process, a material temperature at which the tube wall regions or tube wall segments is held, controlled, or regulated.

9. The method according to claim 1, wherein the stress-relief annealing process is adjusted and regulated by at least one of:
   a measurement of expansion of the tube wall regions or tube wall segments for heat treatment;
   a measurement of a material temperature of the tube wall regions or tube wall segments for heat treatment;
   by adjustment and regulation of a combustion rate for generating the flue gas or the hot air or the hot gas; and
   by adjustment and regulation of a throughflow rate of a cooling medium.

10. The method according to claim 1, wherein, during the stress-relief annealing process, a material temperature at which the tube wall regions or tube wall segments is held and expansion of the tube wall regions or tube wall segments for heat treatment is regulated by a medium selected from the group consisting of a cooling medium, a cooling medium flowing inside tubes of the tube wall region or tube wall segments, and air conducted into the tubes.

11. The method according to claim 1, wherein, during the stress-relief annealing process, tube wall regions or tube wall segments not for heat treatment or adjoining tube wall regions or tube wall segments for heat treatment are cooled simultaneously from at least one of the outside and the inside using a cooling medium to a material temperature below a stress-relief annealing temperature.

12. The method according to claim 11, wherein the cooling medium comprises air or atomized water spray.

13. The method according to claim 11, wherein the cooling medium comprises cooling air.

14. The method according to claim 1, wherein, during the stress-relief annealing process, both the tube wall regions or tube wall segments for heat treatment and also, conductively connected thereto, tube wall regions or tube wall segments not for heat treatment are impinged on from the outside or from the inside by hot flue gas or hot air or hot gas and, for this purpose, are cooled reciprocally from the inside or from the outside by a cooling medium flowing through.

15. The method according to claim 14, wherein the cooling medium comprises cooling air.

16. The method according to claim 1, wherein the tube wall regions or tube wall segments comprise the material T23 or 7CrMoWVMoNb 9-6 or T24 or 7CrMoVTiB 10-10.

17. The method according to claim 1, wherein the tube wall regions or tube wall segments form part of a superheater of the steam generator of a power plant.

18. The method according to claim 1, wherein the stress-relief annealing process is performed after the tube wall regions for heat treatment have undergone repair work.

19. The method according to claim 1, wherein the stress-relief annealing process is performed after the tube wall regions for heat treatment have undergone a repair welding process.

20. A method for erecting tube walls, which surround a combustion chamber of a steam generator of a fossil-fired power plant, comprising:
   placing manufactured tube wall regions or tube wall segments into their installation position, in which they surround the combustion chamber in the steam generator by arranging and erecting the manufactured tube wall regions or tube wall segments so as to surround the combustion chamber of the fossil-fired power plant;
   welding the manufactured tube wall regions or tube wall segments together to form large-area formed erected steam generator tube walls; and
   subsequently subjecting substantially an entirety of the manufactured tube wall regions or tube wall segments of the large-area formed erected tube walls in their installation position in the installed state in the steam generator, to a stress-relief annealing process by heating substantially the entirety of the large-area tube wall regions or tube wall segments with a warmed heating gas, a hot gas, a hot flue gas, or a hot air, wherein the stress-relief annealing process comprises:
     generating, within the combustion chamber of the steam generator, the warmed heating gas, the hot gas, the hot flue gas, or the hot air through the combustion of a fuel, or introducing the warmed heating gas, the hot gas, the hot flue gas, or the hot air into at least one of the combustion chamber of the steam generator and the tubes of the tube wall regions or tube wall segments for heat treatment, and
     supplying the warmed heating gas, the hot gas, the hot flue gas, or the hot air to at least one of the outside and the inside of the tube wall regions or tube wall segments for heat treatment as part of the stress-relief annealing process, wherein the tube wall regions or tube wall segments are part of a diaphragm wall.

21. The method according to claim 20, wherein the erected and installed tube wall regions or tube wall segments form a diaphragm wall and are subjected in their installed position in the installed state in the steam generator to the stress-relief annealing process.

22. The method of claim 1, wherein the stress-relief annealing process comprises heating the tube wall regions or tube wall segments for heat to a material temperature selected from the group consisting of ≥500° C. and ≥550° C.

23. The method of claim 1, wherein the stress-relief annealing process comprises heating the tube wall regions or tube wall segments for heat to a material temperature selected from the group consisting of ≤600° C. and ≤740° C.

24. The method according to claim 1, wherein, during the stress-relief annealing process, expansion of the tube wall regions or tube wall segments for heat treatment is controlled or regulated.

25. The method according to claim 9, wherein the adjustment and regulation of the combustion rate for generating the warmed heating gas, the hot gas, the hot-flue gas, or the hot air is in the combustion chamber of the steam generator.

26. The method according to claim 1, wherein, during the stress-relief annealing process, the tube wall regions or tube wall segments for heat treatment and tube wall regions or tube wall segments not for heat treatment adjoining the tube wall regions or tube wall segments for heat treatment are cooled using a cooling medium flowing through or along the outside of conductively interconnected tube wall regions or tube wall segments for heat treatment and tube wall regions not for heat treatment.

* * * * *